Figure 1:
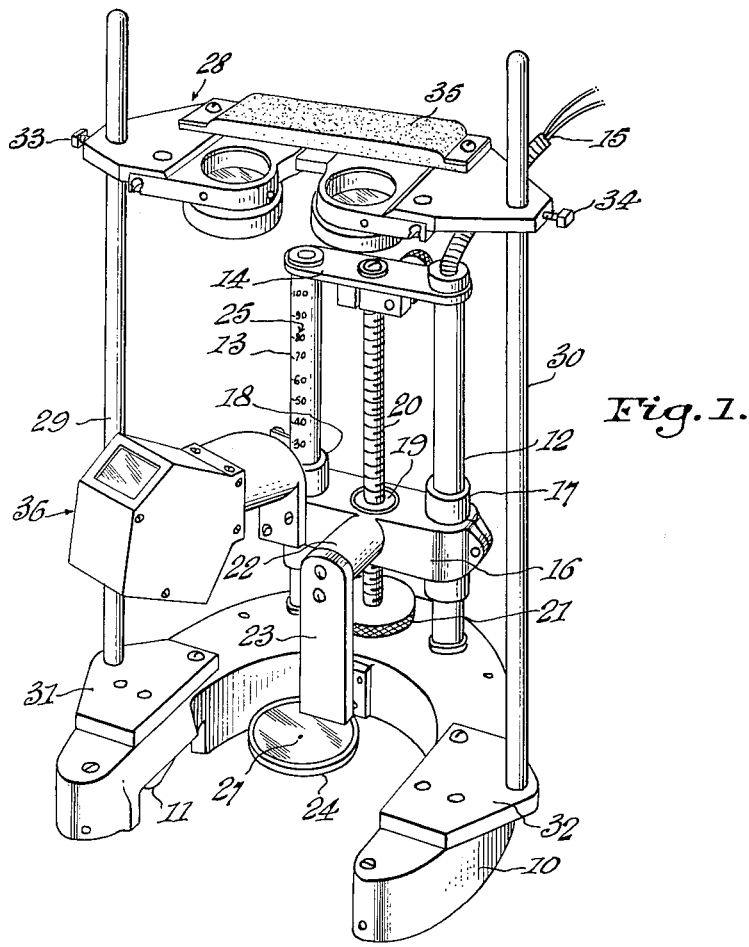

Jan. 11, 1966   F. F. BIZZOCO ETAL   3,228,287
DEVICE FOR COMPILING INFORMATION FROM AN ANAGLYPH
Filed Feb. 9, 1960                               2 Sheets-Sheet 1

INVENTORS
FELIX F. BIZZOCO
JOSEPH B. THEIS
BY
ATTORNEYS

3,228,287
DEVICE FOR COMPILING INFORMATION
FROM AN ANAGLYPH
Felix F. Bizzoco, Washington, D.C., and Joseph B. Theis, Rockville, Md., assignors to the United States of America as represented by the Secretary of the Army
Filed Feb. 9, 1960, Ser. No. 7,731
4 Claims. (Cl. 88—29)
(Granted under Title 35, U.S. Code (1952), sec. 266)

The invention described and illustrated herein may be manufactured and used by or for the Government for governmental purposes without the payment of any royalty thereon.

The present invention relates in general to photogrammetry and in particular relates to a process, a product and an apparatus for extracting information from photographs.

As used hereafter, an anaglyph is a picture combining two images of the same object, recorded from different points of view, one image in one color being superposed upon the second image in a complementary color, which when viewed through complementary color filter lens produces a stereoscopic or third dimensional effect. A photogrammetric anaglyph, as used hereafter, is an anaglyph so compiled as to permit accurate measurement under three dimensional viewing.

Several stereoscopic plotters have been developed and are now in use which produce absolutely oriented spatial models of terrain for compiling topographical maps and gathering other dimensional intelligence. One such device is the well known Multiplex instrument depicted in outline form in FIG. 3. The instrument was arbitrarily chosen to illustrate the present invention, it being understood that the Multiplex instrument itself does not comprise a part of the present invention, and the present invention is not limited thereto. Any instrument which produces a similar spatial model oriented to the accuracy desired could be used in connection with the present invention.

A complete description of the Multiplex and the procedure for using it is set out in "Department of the Army Technical Manual," TM5–244, June 1954, Library of Congress call No. U 408.3.A5 TM5–244, 1954. The Multiplex has a base table 50. A pair of vertical support members, one of which is shown at 51, support a horizontal rail 52 which can be adjusted to any height on the vertical supports. A pair of projectors 53 and 54 slide along the rail 52. Each projector can be adjusted in six ways so that the projectors can be positioned at any point and at any attitude. Each projector is adapted to receive a photographic transparency or diapositive and to project an image of the photograph downwardly toward the base table 50.

In the normal procedure for establishing an oriented spatial model, a pair of diapositives are prepared from a stereoscopic pair of aerial photographs which were taken from different camera stations in such a manner that a portion of the same terrain appears on both photographs. Using the projections as a guide, the two projectors are oriented with respect to each other to recreate to scale the same geometric relationship between the projected rays of light as the relationship which existed between the terrain and the cameras at the instant the original photographs were taken. When the two projectors are properly oriented, each light ray is in correct relationship to every other light ray in the projection. Each projector projects an image in different, complementary colors, normally cyan and magenta so that when the oriented images are viewed as an anaglyph through dichromatic complementary color spectacles, a small spatial relief model of the terrain becomes apparent to the viewer.

This recreation of the same geometric relationship of light rays as originally existed is accomplished primarily by orientation of the relative positions and attitudes of the projectors to duplicate, in reduced scale, the relative positions and attitudes of the camera at the instant the original photographs were exposed. When the geometric relationship of the light rays has been duplicated, within acceptable error limitations, the spatial model is said to be absolutely oriented. Of course the precision with which the diapositives are made, the ability of the projector to duplicate the cone of light rays received by the camera, the skill of the operator, and other factors have a direct effect upon the ultimate accuracy of the spatial model. A detailed description of the techniques for orientation of the spatial model is set out in chapter 5 of the publication referred to above.

When using the Multiplex spatial model according to previously established techniques, information is compiled directly from the spatial model by measurements using the projected light rays reflected from the platen of the tracing table to the eyes of the operator. This means that the expensive Multiplex instrument is not available for use in connection with other spatial models for a considerable length of time during the compilation procedure. In addition, only one or two persons can work simultaneously to compile the information from each spatial model, and these persons must be skilled technicians. To increase production, additional expensive Multiplex instruments must be obtained and additional personnel trained.

Frequently, especially for military field work, it is desirable to have a mobile photogrammetric unit, in which case the Multiplex instrument is housed in a large van. Each time the van is moved, the model usually must be reoriented because the slightest jar to the instrument requires reorientation. The orientation procedure frequently requires several hours.

In accordance with the present invention, an absolutely oriented spatial model is prepared from a pair of aerial photographs in a conventional manner. The projected images of the spatial model are then photographed and printed on a common sheet with one image printed in one color and superposed upon the second image which is printed in a complementary color to produce a photogrammetric anaglyph. Then by means of a novel device termed an anaglyphometer, the desired information is compiled from the anaglyph.

The orientation and photographing steps combined require only slightly longer than the model orientation procedure alone. As soon as the model is photographed the Multiplex instrument can be used to orient and establish another model. Only one technician trained and skilled in the orientation procedure is required. Meanwhile, other persons can prepare any number of anaglyphic prints and distribute them to a large number of persons. Using the new and novel anaglyphometer described and claimed herein, these persons can simultaneously compile the desired information, each person working on an assigned sector. Then the information individually compiled can be integrated into a master manuscript. This process permits a great saving in the elapsed time required to prepare a manuscript of a given area which is of great value to military forces. Also, the device for compiling the information from the anaglyph is much less expensive than the Multiplex instrument. The absolutely oriented spatial model is "canned" by the recording process and this adds to the mobility of the photogrammetry van, because the spatial model need never be established with the Multiplex again. Should the need arise for future work, the anaglyphic record of the absolutely oriented spatial model is available.

Therefore, it is an object of the present invention to provide a photogrammetric process which is more economical in that the required number of expensive instruments is reduced.

Another object of the present invention is to provide a photogrammetric process which permits a larger number of persons to work simultaneously, thereby permitting any given job to be completed in less time.

Still another object of the present invention is to provide a photogrammetric process which requires fewer highly skilled technicians.

Still another object of the present invention is to provide a process for producing a photogrammetric anaglyph.

A further object of the present invention is to provide an anaglyphic print which can be readily used for accurate dimensional measurements.

A still further object is to provide a device for measuring vertical and horizontal distances on an anaglyph and for compiling military intelligence and other geographical information.

Figure 2:
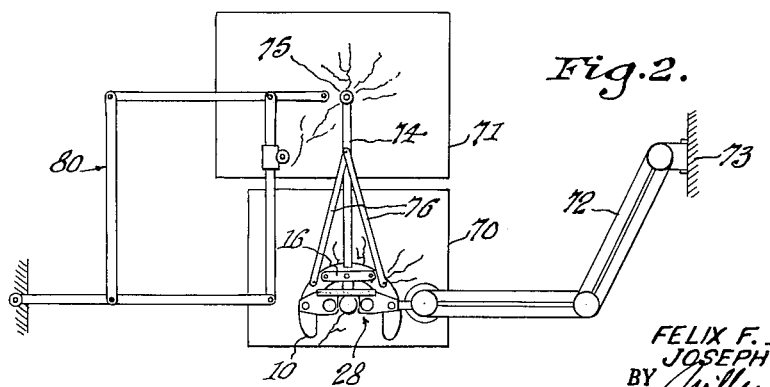
Figure 3:
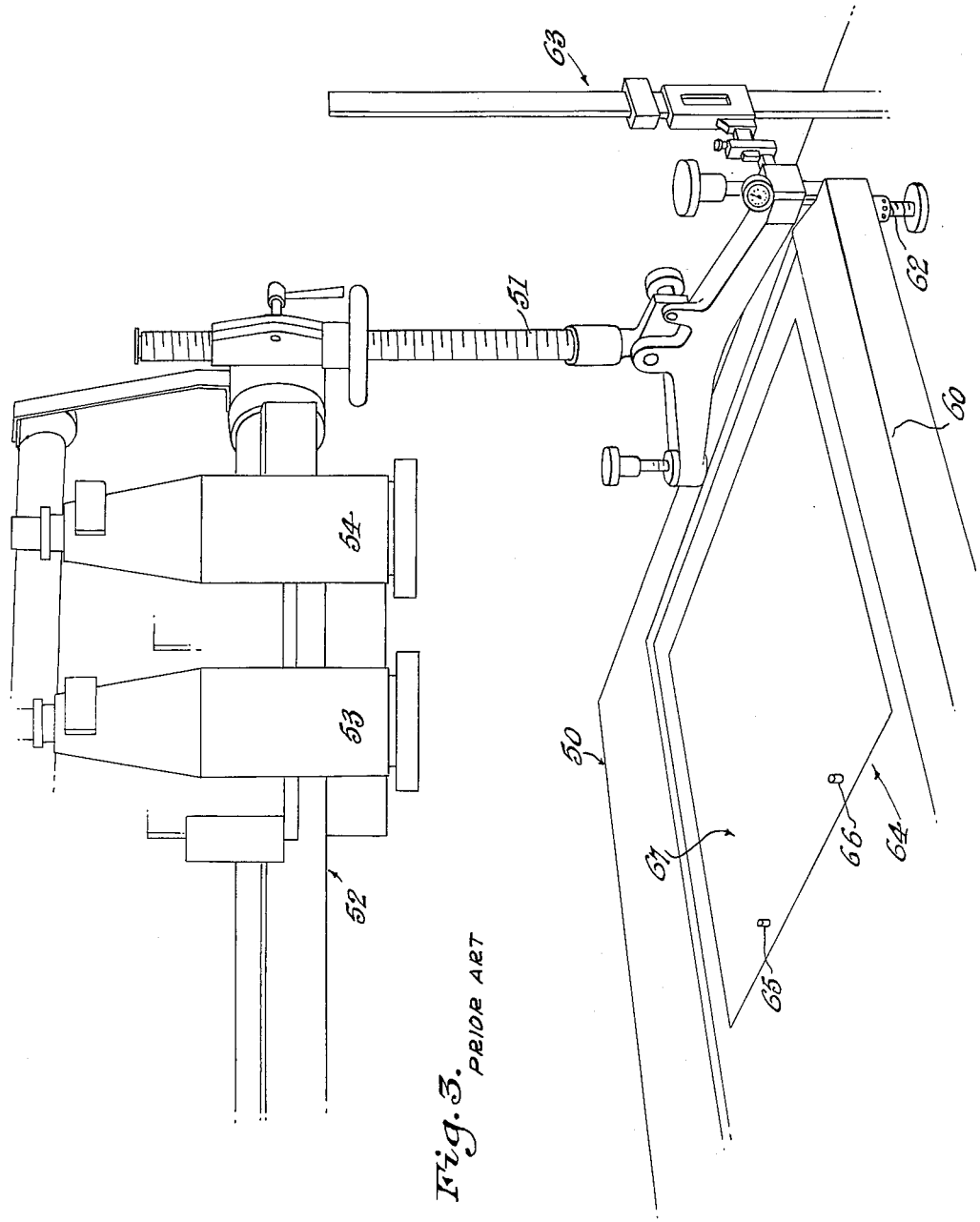

Additional objects and advantages will become apparent from the following specification and accompanying drawings in which:

FIG. 1 is a perspective view of a device constructed in accordance with the present invention;

FIG. 2 is a plan view of the device of FIG. 1 used in combination with other drawing devices; and, FIG. 3 is a diagrammatic perspective view of a Bausch and Lomb Multiplex instrument used in photogrammetric work and other equipment used in connection with the present invention; these devices are well known and do not constitute a part of the present invention but are included merely for illustration purposes.

The first step in the present invention is the absolute orientation of a spatial model. One well known and accepted procedure for establishing an absolutely oriented spatial model using a Multiplex instrument has previously been outlined and a publication has been cited which sets out the orientation procedure in detail. Broadly, the second step is the recordation of the spatial model as it appears at an arbitrarily selected plane, referred to herein as the record plane. The record plane is a plane parallel to the datum plane of the spatial model and between the datum plane and the lowest surface point in the model which it is desired to measure. The record plane must be parallel to the datum plane within accepted limits or distortions in the recorded picture will result and measurements will be inaccurate. Any point which is below the selected record plane in the model cannot be viewed stereoscopically on the record in the same manner as the points above the record plane. The record of the spatial model is best made by photographing the projected images in the oriented positions, maintaining the orientation of the images during the printing process, and printing the images in different complementary colors so that an anaglyph is produced which can be measured for compilation purposes.

One process which has been devised and proven satisfactory for recording the oriented images includes separate exposures of each image. After the model has been oriented, a vacuum table 60 is placed on the base table 50 which is the datum plane. A height gauge 63 is used to determine the height of the surface of the vacuum table above the base table and the vacuum table is oriented exactly parallel to the datum table by means of three adjustable legs, one of which is shown at 62. The vacuum table has an airtight chamber except that the upper surface 64 is uniformly perforated throughout by a large number of minute holes. Embedded in the surface of the vacuum table are two registration pegs or studs 65 and 66 which are of a standardized diameter and spacing. A vacuum pump is connected to exhaust the air from the interior of the table.

A sheet of film 67 is punched with holes to fit the registration studs and placed over the studs and on the surface of the vacuum table. Atmospheric pressure then holds the film flat against the surface of the vacuum table. The vacuum table should have an accurate plane surface and with the film held tight against the vacuum surface, minute irregularities are substantially eliminated from the surface of film. It will be appreciated that an irregularity one millimeter in height would inject an error of several feet into the final compilation.

A half tone screen is placed over the film and the light from a single projector is then switched on for the length of time required to expose the film. Depending upon the type of film used, best results can normally be obtained by white light and the color filter in the projector should be removed for the exposure. The same procedure is repeated with another sheet of film which is exposed to the light from the other projector except that the half-tone screen is rotated approximately 15 degrees relative to its original position to prevent a moiré effect in the final print. The two films are then developed to produce negatives.

Exposure to color paper has also been successful in which case both images are exposed on a single sensitized sheet placed at the record plane. When using this method, negative diapositives must be used in the Multiplex projectors to prevent negative images. When developed, the two images appear in complementary colors as before. The procedure eliminates the halftone screen which reduces resolution of the final print. Also, the orientation by studs in the exposure and printing process as hereafter described is eliminated. Of course any method of recording the two images as they appear at the record plane on a single sheet to produce a pair of complementary images which can be viewed through complementary lens to produce a stereoscopic effect is within the broad scope of the present invention.

An inexpensive process which has proven satisfactory for printing the anaglyphic record of the spatial model from the negatives is the well known "rub-on" process. When using this process, a pair of standardized registration holes are punched in a print sheet, which is fabricated of a special plastic material. The print sheet is then coated with a blue printing solution. One of the negatives, preferably the one which was exposed from the projector normally projecting a blue light, is then placed over the dried blue solution, emulsion side up to prevent a mirror image, and oriented by means of registration studs which are inserted in the registration holes of the print sheet and the negative. The print sheet and negative, as relatively oriented, are placed on a vacuum frame to insure that the print sheet is perfectly flat, and exposed to arc light for a prescribed period. At points where the arc light passes through the negative and strikes the solution, the solution becomes permanently fixed on the print sheet. The remainder of the solution is washed off and the print is dried. A complementary color solution, in this case red, is then applied over the already fixed blue image and the same procedure is repeated except that the other negative is used. The resulting anaglyphic print is a record of the two oriented images as they appeared at the record plane, which actually was the plane of the upper surface of the two pieces of film. Of course any manner of printing the anaglyphic record can be employed so long as the relative orientation of the images is maintained within acceptable limits, the images are not distorted, and the printed images are in complementary colors or otherwise capable of stereoscopic viewing and measuring.

After the anaglyph has been printed, the remaining step of the process can broadly be described as the compilation step. Dimensions perpendicular to the datum plane and hence perpendicular to the record plane, which is the face of the anaglyph, represent to scale the relative vertical heights of objects shown on the anaglyph. Of course the heights also represent elevations if the elevation of any one point shown on the anaglyph is known.

These vertical distances can readily be measured and compiled by means of the device shown in FIG. 1.

Referring now to FIG. 1, a U-shaped or horseshoe base member 10 is adapted to rest upon the anaglyph being measured. The underside of the base 10 may be provided with either ball-type rollers or embedded agate gliders to reduce the friction when the device is moved over an anaglyph. A pair of oppositely disposed light ports, one of which can be seen at 11, are provided in the base for illuminating the anaglyph being viewed. A pair of upright members 12 and 13 are connected to the base. A spacer member 14 interconnects the tops of the upright members 12 and 13. A light cord 15 passes down through the member 12 and is connected to energize the lights in the light ports 11. A vertically traveling carriage 16 receives the upright members 12 and 13 in sleeve bearings 17 and 18 respectively. The carriage also has a threaded tap 19 which receives an elevating screw 20. The elevating screw 20 is journaled in the base 10 at the bottom and in the spacer member 14 at the top. The screw can be rotated by knurled thumb wheel 21 and when rotated the carriage 16 is moved upward or downward along the upright members 12 and 13 by action of the engaged threads of the tap 19 and screw 20.

Connected to the vertically moving carriage is a horizontally extended arm 22 which supports a depending arm 23. Connected adjacent the bottom of the latter arm is a transparent platen 24 which has a small reference mark 27 inscribed on the under surface thereof. This construction permits the reference mark to be moved as close to the anaglyph as is necessary for measuring purposes.

The upright member 13 is provided with a scale 25 calibrated, for example, in millimeters. Mounted on the carriage 16 is a conventional vernier scale and a viewer 36 which presents an enlarged view of the vernier scale and the adjacent millimeter scale 25. The vernier scale can be adjusted and set for scale indexing purposes. By this combination, the position of the carriage 16 and consequently the reference mark 27 relative to the anaglyph upon which the device is resting can readily be determined.

A lens frame 28 is supported for vertical sliding motion by a pair of upright members 29 and 30 which are connected to the base 10 by plates 31 and 32. The height of the lens frame relative to the base can be adjusted manually and set in the adjusted position by means of thumb set screws 33 and 34. A pair of complementary cyan and magenta filter lenses are mounted in the lens frame and provide the means for viewing the anaglyph stereoscopically. A sponge rubber headrest 35 is mounted on the lens frame to support the head and insure that the head and hence the eyes remain in substantially the same position relative to the lens and reference mark during the measuring operation.

In operation, the device is placed on an anaglyph which is resting on an accurate plane surface. The image of the object to be measured is centered in the viewing area of the horseshoe base. The height of the lens frame above the base is previously adjusted and set to the convenience of the operator, normally 10 to 12 inches, so that the operator can clearly see the objects and distinguish the third dimension. Once the height of the lens frame is set, it must not be altered for the remainder of the measurements of the same anaglyphic print by the same person. When the lens frame is set in position, it insures that the head and eyes of the operator always remain in the same vertical position relative to the anaglyph, and in the same horizontal position relative to the reference mark. With his head upon the headrest, the operator views the anaglyph and reference mark through the lens and adjusts the height of the reference mark above the anaglyph by manipulation of the thumb wheel until the reference mark appears to rest upon or coincide with the point to be measured. The reference mark appears to rest upon the selected point when the mark is at the height where it is directly in line with both the image seen with the left eye and with the image seen with the right eye. The reference mark is then resting upon the surface point of the imaginary spatial model produced by the anaglyph when viewed stereoscopically. If one of the points on the anaglyph is of a known elevation, all other heights and elevations on the anaglyph can be determined by similar measurements and geometric equations which convert the heights measured and read on the vernier scale to the actual heights of the terrain. These equations take into account the distance between the pupils of the eyes of the operator and the distance from the anaglyph to the pupils when the head is upon the headrest.

Horizontal distances can also be measured from the anaglyphic record by means of the novel viewing device shown in FIG. 1. Referring now to FIG. 2, an anaglyphic record print is represented at 70 and a manuscript sheet upon which desired topographic information is to be compiled is represented at 71. Both sheets are resting preferably upon the same plane surface. The viewing device rests upon the anaglyphic print and is free to be moved around over the print. The base of the viewing device is rigidly connected to a conventional universal drafting machine 72 which is mounted on some base support 73. A tracing arm 74 extends from and is rigidly secured to the horseshoe base and supports a pencil chuck 75. A pair of braces 76 secures the arm 74. The well known operation of the universal drafting machine is such that the tracing arm always remains in a vertical position as the viewing device is moved over the anaglyph, and the path of the reference mark over the anaglyph is reproduced by the pencil chuck on the manuscript.

Contour lines can be traced by setting the reference mark at the desired height and maintaining the mark in contact with the surface as the device is moved to trace around a hill, for example. Geographical features such as rivers, roads and pipelines, which normally do not remain at one elevation, can be located by maintaining the reference mark in contact with the surface of the feature by adjustment of the elevating screw as the viewing device is moved over the anaglyph. By using the anaglyphic print and this technique, horizontal displacements due to relief which occur when the object is at an oblique angle to the camera are automatically eliminated.

When it is desired to reduce or enlarge the scale of the anaglyph for compilation on the manuscript, a conventional parallelogram type pantograph 80 can be employed, in which case the pantograph can be connected to the pencil chuck, the pencil chuck arm, or directly to the horseshoe base. The same tracing procedures are then followed with the viewing device.

It is readily apparent to those skilled in the art of photo interpretation that the capability of the anaglyphometer to yield accurate information as to vertical and horizontal distances has utility indepenudent from and in addition to the described capabilities of the device in map compilation.

We claim:

1. A device for compiling information from an anaglyph comprising a base member having a viewing area under which the anaglyph is positioned, an upright frame connected to said base member, a transparent member having a visible reference mark thereon, said member being movably mounted upon said upright frame for substantially vertical movement of the reference mark along the upright frame, means for indicating the position of said reference point relative to said base member, and a pair of horizontally spaced complementary filter lenses mounted upon said upright frame and above said reference point for simultaneously viewing said reference point and the viewing area of said base member through each of said horizontally spaced lenses.

2. A device for compiling information from a photogrammetric anaglyph comprising a base member having an open viewing area and adapted to rest on an anaglyph, a first upright support frame connected to said base member, a second frame slidable in a vertical direction along said first frame, screw means for moving the second frame along the first upright frame, a transparent member having a visible reference mark thereon connected to said second frame and movable therewith, means for indicating the postion of said second frame and said reference mark relative to said base member, and complementary filter viewing lenses slidably mounted on a frame at a distance from said base and above said reference point whereby the reference point and the viewing area of said base can be viewed simultaneously.

3. A tracing device for compiling information from a photogrammetric anaglyphic print, said device comprising a base member having an open viewing area and adapted to rest on said print, said base member further comprising means for illuminating said print, a first upright support frame connected to said base member, a second frame slidably mounted on said first frame for vertical movement relative thereto, interengaging screw means on said two frames for producing said vertical movement, a horizontally extending, flat transparent platen member connected to said second frame in fixed relation thereto and movable therewith and having a visible reference mark on its under surface, means for indicating the position of said second frame and of said reference mark relative to said base member, a third frame mounted on said base member and comprising a pair of upright members, a lens frame extending substantially horizontally between said last mentioned upright members and slidably supported by them for substantially vertical motion, said lens frame comprising a pair of lenses of color complementary one to the other, said lens frame further comprising set screw means engageable with said upright lens frame supporting members for locking said lens frame at any height to which it may be set relative to said supporting members, illumination means mounted in said base member and providing to an operator of said device a view of a portion of said print located in said viewing area, said view being constituted of light rays proceeding from said illumination means to said viewed area of said print and thence through said transparent platen member and said lenses to the eyes of the operator.

4. An anaglyphometer for photogrammetric compilation of a map manuscript from a photogrammetric anaglyphic print, said anaglyphometer comprising a base member adapted to rest on said print, said base member being shaped to provide a viewing area for viewing a portion of said print, said base member further comprising means for illuminating said portion, a first frame extending substantially vertically upwardly from said base member, a second frame slidably mounted on said first frame for substantially vertical movement relative thereto, interengaging means on said two frames for producing said relative motion, mensuration means operatively associated with said frames for measuring said motion, means constituting a reference mark connected to said second frame in permanent fixed relation thereto and located above said viewing area, a pair of lenses, the lenses of the pair being colored complementarily one to the other, a lens frame mounting said lenses, substantially upright means mounted on said base member and mounting said lens frame in substantially horizontal position above said reference mark and viewing area for substantially vertical sliding motion along said last mentioned means relative to said base member and means for fixing the vertical position of said lens frame relative to its support means.

References Cited by the Examiner
UNITED STATES PATENTS

| | | | |
|---|---|---|---|
| 1,128,979 | 2/1915 | Hess | 88—29 |
| 2,168,183 | 8/1939 | Wilmanns et al. | 96—40 |
| 2,177,417 | 10/1939 | Eggert et al. | 96—40 |
| 2,363,643 | 11/1944 | Cook | 88—29 |
| 2,421,609 | 6/1947 | Good | 88—29 |
| 2,451,031 | 10/1948 | Kelsh | 88—24 |
| 2,492,870 | 12/1949 | Kelsh | 88—24 |
| 2,696,752 | 12/1954 | Bean | 88—24 |
| 2,704,960 | 3/1955 | Loud | 88—29 |
| 2,847,906 | 8/1958 | Santoni | 88—29 |
| 2,871,759 | 2/1959 | Sconce et al. | 88—29 |
| 2,901,941 | 9/1959 | Brumley | 88—29 |

OTHER REFERENCES

The Multiplex Aero-Projector, October 3, 1940.

Theis: "Photogrammetric Eng.," vol. 25, No. 4, pages 619–623.

JEWELL H. PEDERSEN, *Primary Examiner.*

MILTON STERMAN, PHILLIP E. MANGAN,
*Examiners.*